United States Patent
Silva et al.

(10) Patent No.: US 6,414,178 B1
(45) Date of Patent: Jul. 2, 2002

(54) METHOD FOR THE CONTINUOUS PREPARATION OF CHLOROFORMATE PRODUCTS OF HALOGENATED DIHDROXY COMPOUNDS

(75) Inventors: James Manio Silva, Clifton Park; David Michel Dardaris, Ballston Spa; Thomas Joseph Fyvie, Schenectady; Pierre-Andre Bui, Clifton Park; Daniel Joseph Brunelle, Burnt Hills, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/625,476

(22) Filed: Jul. 25, 2000

(51) Int. Cl.$^7$ ............................................... C07C 69/76
(52) U.S. Cl. ........................ 560/8; 560/101; 528/198; 558/282
(58) Field of Search .................... 560/8, 101; 528/198; 558/282

(56) References Cited

U.S. PATENT DOCUMENTS 5,218,078 A * 6/1993 Marks et al. ................ 528/202
5,399,657 A * 3/1995 van Hout et al. ........... 528/198

FOREIGN PATENT DOCUMENTS

| EP | 207 292 | * | 1/1987 |
| EP | 523 686 | * | 1/1993 |
| WO | WO 0058259 | * | 10/2000 |

* cited by examiner

Primary Examiner—Ralph Gitomer
Assistant Examiner—Devesh Khare
(74) Attorney, Agent, or Firm—Andrew J. Caruso; Noreen C. Johnson

(57) ABSTRACT

This invention relates to a process and apparatus for the continuous preparation of mono and bis-chloroformate products of halogenated dihydroxy compounds by an interfacial process. The mono and bis-chloroformate products may optionally be converted to capped oligomers.

10 Claims, No Drawings

METHOD FOR THE CONTINUOUS PREPARATION OF CHLOROFORMATE PRODUCTS OF HALOGENATED DIHDROXY COMPOUNDS

FIELD OF THE INVENTION

This invention relates to a process and apparatus for the continuous preparation of mono and bis-chloroformate products of halogenated dihydroxy compounds by an interfacial process. The mono and bis-chloroformate products may optionally be converted to capped oligomers.

BACKGROUND OF THE INVENTION

Mono- and bis-chloroformates of halogenated diphenols are useful in the preparation of a wide variety of materials including additives that function as flame retardants and higher molecular weight products. For example, membranes made from high molecular weight tetrabromobisphenol A polycarbonate have shown high selectivity for oxygen/nitrogen separation.

In making mono- and bis-chloroformates of halogenated diphenols, it is desirable to minimize production of by-product diarylcarbonates (DAC). This enables the mono- and bis-chloroformates of halogenated diphenols to be used in subsequent reactions to prepare oligomers or higher molecular weight product without first being purified by such methods as distillation.

Diarylcarbonates have a low melting point, compared with the glass transition temperature of polycarbonate or of capped oligomeric halogenated polycarbonate additives, and are therefore the last components to freeze during a polycarbonate molding operation. Therefore, halogenated polycarbonate with significant levels of DAC requires longer molding cycle times compared with polycarbonate that is substantially free of DAC. Further, because DAC can sublime, a polycarbonate containing diaryl carbonates can lead to undesirable effects, such as "plate out" in which the DAC from previous molding cycles condenses and deposits on the mold and leads to blemishes in subsequent moldings. Further, subliming DAC has a tendency to condense and plug in extruder vent lines, necessitating frequent maintenance and equipment outages. The term "DAC" as used herein is understood to include also di(alkylphenyl) carbonates and di(arylphenyl)carbonates.

U.S. Pat. No. 5,212,281, Munaj et al., discloses a process for the preparation of high molecular weight halogenated polycarbonate in a two stage continuous process. In the first stage, an oligomer mixture is formed and in the second stage, the oligomer mixture is polymerized in the presence of a coupling catalyst and an additional base. For the phosgenation step, the preferred amount of phosgene is 1.8–2.2 moles per mole of halogenated diphenol., according to Munaj et al.

It would be desirable to develop a process whereby the mono- and bis-chloroformates of halogenated diphenols may be produced directly, without the need for purification, and in a continuous manner. It would further be desirable to develop a process to produce the mono- and bis-chloroformates of halogenated diphenols that may be coupled with a process for oligomer synthesis, to produce a product having low DAC content and good quality.

It would further be desirable to develop a process to produce the mono- and bis-chloroformates of halogenated diphenols in a continuous reactor or reactor system in which the residence time is relatively low (<5 minutes). Finally, it would be desirable to develop a process to produce the mono- and bis-chloroformates of halogenated diphenols with efficient use of the carbonyl halide. The efficiency of carbonyl halide use is defined as: 100*(moles C=O incorporated into chloroformate product)/(mole COCl2 fed to process), where COCl2 (phosgene) is a typical carbonyl halide. The C=O incorporated into the chloroformate product represents both carbonate linkages and chloroformate groups.

BRIEF SUMMARY OF THE INVENTION

The present invention solves these problems, and provides further surprising properties. These and further objects of the invention will be more readily appreciated when considering the following disclosure and appended claims.

In a first aspect, the invention relates to a continuous process for the preparation of mono- and bis-chloroformates. In one embodiment, the invention relates to a continuous process for the preparation of mono- and bis-chloroformates from halogenated diphenols of structure (I)

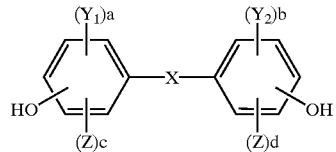

X is selected from the group consisting of substituted or unsubstituted divalent $C_1$–$C_{18}$ hydrocarbon radicals, —S—, —S—S—, —O—,

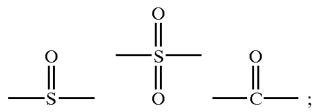

each Z is independently hydrogen, a linear or cyclic alkyl, alkoxy, aryl, alkaryl, aralkyl or aryloxy radical;
each Y is the same or different halo radical, selected from the groups consisting of fluoro, chloro, bromo and iodo; and a is an integer from 0 to 4; b is an integer from 0 to 4; with the proviso that both a and b are not equal to 0; and c=4-a and d=4-b; the process comprising the steps of:
a) introducing
  1) an aqueous caustic solution;
2) a carbonyl halide;
  3) at least one halogenated diphenol compound;
  4) at least one inert organic solvent; and
  5) a catalyst into a continuous reaction system;
b) effecting contact between 1), 2), 3) 4) and 5) for a time and at conditions sufficient to produce a chloroformate of the halogenated diphenol.

The invention further relates to chloroformates of halogenated diphenols prepared by the aforementioned methods, reaction systems utilizing the method coupled with polycarbonate polymerization systems, and polycarbonates produced by these systems.

In a second aspect, the invention relates to the preparation of capped oligomers of halogenated diphenols in a process coupled with the chloroformate synthesis reactor.

DETAILED DESCRIPTION OF THE INVENTION

The present invention may be understood more readily by reference to the following detailed description of the preferred embodiments of the invention and the examples included therein.

Before the present method and apparatus are disclosed and described, it is to be understood that this invention is not limited to specific systemic methods or to particular formulations, as such may, of course, vary. It is also to be understood that the terminology used herein is for the purpose of describing particular embodiments only and is not intended to be limiting.

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

"Molar flow rate" is in moles per minute, unless otherwise stated.

"Mixture average temperature" is defined as the temperature that a mixture of two or more combined streams achieves at equilibrium under adiabatic conditions, i.e., with no input or loss of heat.

The term "polycarbonate" as used herein includes copolycarbonates, homopolycarbonates and (co)polyestercarbonates.

The terms "endcapping agent" and "chainstopping agent" are used interchangeably.

A "semi-batch" reactor receives an initial charge of materials, after which one or more reactants and optionally solvents are added to the reactor during the course of the reaction. Such reactors, however, are often referred to simply as "batch" reactors. The terms "batch" and "semi-batch" are used interchangeably throughout the rest of the specification.

Throughout this application, where publications are referenced, the disclosures of these publications are hereby incorporated by reference into this application in order to more fully describe the state of the art to which this invention pertains.

In one aspect, this invention concerns a continuous process for the production of mono or bis-chloroformates of halogenated diphenols useful in polymer synthesis, in particular in polycarbonate synthesis.

In another aspect, this invention concerns a process for the production of capped oligomeric polycarbonates of halogenated diphenols in which a process for producing mono- or bis-chloroformates of halogenated diphenols is coupled with a reaction system for producing capped oligomeric polycarbonate product.

I. Continuous Process for the Production of Mono or Bis-Chloroformates of Halogenated Diphenols As mentioned, in a first aspect, the invention concerns the preparation of mono and bis chloroformates of halogenated diphenols by a continuous process. The products are suitable as oligomers in a polymer synthesis. "Reaction system" and "reactor" as used in section (I) of the specification refer to the continuous process for the production of mono- and bis-chloroformates by a continuous process.

The process of the instant invention is conducted in a reaction system comprising a vessel or vessels in which the mono- and bis-chloroformates of halogenated bisphenols are produced in continuous manner by interfacial reaction. By "continuous" it is meant that reactants are introduced and products are withdrawn simultaneously from the reaction system. The reaction system may be coupled with a reactor in which oligomers are formed from the mono- and bis-chloroformates of the halogenated diphenols, or the mono- and bis-chloroformates of halogenated diphenols product may be stored in another vessel for later use.

The reaction system has an upstream inlet or input for introduction of feed and a downstream outlet, for recovery of product. Optionally, there may be inlets to the reaction system between the upstream inlet and the downstream outlet for introduction of feed.

The system allows for the continuous production by interfacial reaction of mono- and bis-chloroformates of halogenated diphenols, the process having a short residence time and a high degree of carbonyl halide usage efficiency. The continuous process may be conducted in any equipment arrangement in which a continuous reaction may be effected, including but not limited to a series of continuous stirred tank reactors (CSTRs), a tubular reactor or series of tubular reactors, one or more loop reactors in series and/or parallel, a network of CSTRs and tubular reactors, a column reactor having mixers in several stages, and an agitated column. The reaction system may comprise more than one stage, and cooling as well as introduction of additional reagents may be effected between stages. In the present invention, it is preferable that the usage efficiency for the carbonyl halide be about 75% or greater, and that the residence time be about 5 minutes or less The reaction product from the tubular reactor typically comprises three components: 1) unreacted halogenated diphenol; 2) a monochloroformate product and 3) a bischloroformate product. In one embodiment, there is essentially no unreacted halogenated diphenol. Typically, there are from 1.1 to about 1.5 chloroformate groups per halogenated diphenol introduced into the reaction system, in the product. Typically, only a small amount of oligomerization of the halogenated diphenol takes place. If, for example, the halogenated diphenol introduced into the reaction system is tetrabromo BPA or TBBPA (2,2-bis(4-hydroxy-3-bromophenyl)-propane) having the structure:

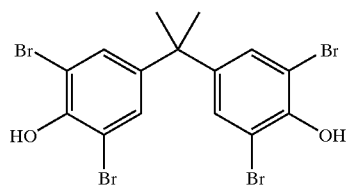

The reaction products are the halogenated diphenol and 1) the monochloroformate:

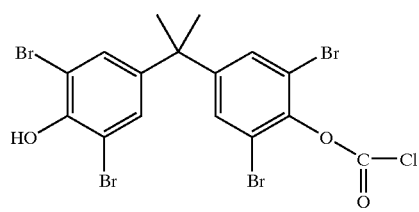

2) the bischloroformate:

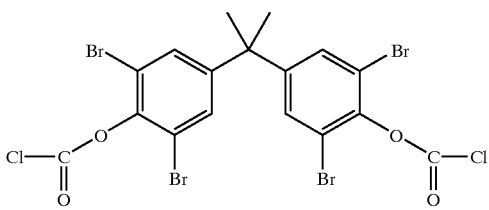

3) the dimer;
4) the dimer monochloroformate;
5) the dimer bischloroformate;

In the effluent, the TBBPA monomer typically comprises from about 0 to about 30 mole %, the monochloroformate typically comprises from about 10 to 15 mole %, the bischloroformate typically comprises from about 50 to abut 80 mole %, and the dimer products typically comprise from about 0 to about 5 mole %, the mole percentages based on the total number of TBBPA units in the effluent. It should be understood that the aforementioned ranges are only guidelines, and are not intended to be restrictive.

If desired, the mono- and bis-chloroformates of halogenated diphenols may be isolated from the reaction product mixture using well known processes, such as distillation and decantation. The mono- and bis-chloroformates of halogenated diphenols product may be stored indefinitely as a solution in a solvent or as a neat liquid. It is preferable to keep the mono- and bis-chloroformates of halogenated diphenols solution or liquid cool and water-free. If there is any water present in the mono- and bis-chloroformates of halogenated diphenols liquid or solution, the mono- and bis-chloroformates of halogenated diphenols liquid or solution should be acidic.

The process conditions in the reaction system to produce the mono- and bis-chloroformates of halogenated diphenols may be varied, and generally any process conditions can be employed provided that the reaction between the carbonyl halide and the halogenated diphenol occurs to produce the mono- and bis-chloroformates of halogenated diphenols product. The feed stream or streams entering the reaction system preferably have a mixture average feed temperature in the range of about −10° C. to about 40° C.; more preferably about 0° C. to about 25° C. The feed stream or streams contain the carbonyl halide, inert organic solvent, aqueous caustic solution, and halogenated diphenol entering the reaction system.

The halogenated diphenol may be fed either as a solution in the inert organic solvent, or it may be fed as an aqueous caustic solution.

The temperature of the mixture in the reaction system is preferably maintained below about 60° C., more preferably below about 50° C. The term "mixture" as used herein refers to the contents of the reaction system, including, but not limited to, the solvent or solvents, the reactants and the caustic. As the reaction is exothermic, the temperature of the reaction mixture increases as the reaction mixture is conveyed through the reaction system. The temperature at which any particular system is maintained depends on the particular solvents, reactants, cooling means, etc.

The reaction system may be cooled or operated adiabatically. Suitable cooling means include a cooling jacket, a pre-cooler heat exchanger, a heat exchanger in a recirculation loop, a heat exchanger between sections of a multiple reactor system, or a reflux condenser. The reaction vessel or vessels may be cooled, or heat may be removed between the reaction vessels, if the system comprises more than one stage. For simplicity in both design and operation, it is preferable to operate the system adiabatically. In order to achieve adiabatic reactor conditions, the reaction vessel or vessels may be insulated according to typical industrial practice.

Prior to introduction into the reaction system, the feed stream or streams may optionally be mixed by suitable mixing means, including but not limited to, an in-line or static mixer, and an orifice mixer. As mentioned "feed stream" or "feed streams" as defined herein refers to the components entering the reaction system, and may include one or more streams entering the reaction system. A mixing zone may be established before the reaction system, the reaction system may comprise a mixing zone, or both.

While in the reaction system, the mixture is preferably agitated at an intensity at least sufficient to prevent segregation of the aqueous and organic phases. If segregation occurs, the conversion of the reactants to the product will be reduced. The agitation of the aqueous and organic phase should be regulated such that the carbonyl halide, e.g. phosgene, is not wasted by increasing its hydrolysis rate, which may occur at excessively intense mixing.

In a tubular reactor, one embodiment of the invention, the mixing intensity is often characterized by a tube Reynolds number, defined as:

$$N_{Re} = \frac{Dv\rho}{\mu}$$

where
D=tube diameter (cm)
v=solution velocity through tube (cm/sec)
$\rho$=solution density (gm/cc)
$\mu$=solution viscosity (gm/cm-sec)

It is preferable to maintain the tube Reynolds number in the range of about 200 to about 100,000, more preferably in the range of about 200 to about 20,000.

The mixture in the reaction system may be agitated by mechanical mixing means, or alternatively, static mixing elements may be placed in the reaction vessel. Static mixing technology is discussed in "Advances in Static Mixing Technology", M. Mutsakis, F. Streiff, and G. Schneider, Chemical Engineering Progress, July, 1986.

The reaction to produce mono- and bis-chloroformates of halogenated diphenols requires an alkali metal base and/or an alkaline-earth metal base herein referred to as a caustic compound. The caustic compound is preferably introduced as an aqueous caustic solution comprising the caustic compound. The aqueous caustic solution preferably comprises potassium hydroxide, sodium hydroxide and mixtures thereof, even more preferably sodium hydroxide. The aqueous caustic solution preferably has a strength of about 10 to about 50 weight percent, preferably between about 15 to about 40 weight percent. The aqueous caustic solution may optionally contain halogenated dichloroformate.

The aqueous caustic solution is preferably introduced into the continuous reaction system in a separate stream from the stream containing the carbonyl halide. In one embodiment, the aqueous caustic solution stream is introduced at the upstream input of the reaction system. Alternatively, the aqueous caustic solution stream may be introduced at any point or input in the reaction system which allows the reaction in the system of the carbonyl halide and the halogenated diphenol to form the mono- and bis chloroformates of halogenated diphenols. The aqueous caustic solution stream may optionally be split into two or more streams, which may have the same or different molar flow rates. These streams may be introduced at different points in the reaction system. It is preferable to introduce the aqueous caustic solution stream at the upstream inlet of the reaction system.

Under substantially adiabatic reaction conditions, the amount of caustic introduced into the reactor section relative to the amount of halogenated diphenol compound and other feed species determines the extent of temperature increase in that section. The temperature sensitivity of the reaction selectivity towards mono- and bis-chloroformates of halogenated diphenols synthesis and away from carbonyl halide hydrolysis is a key factor which is considered in determining the amount of caustic to be added per stage, the number of stages, and the need for interstage cooling, particularly under adiabatic conditions.

In the present invention, the carbonyl, caustic, and halogenated diphenol compound are introduced into the reaction system at flow rates which are based on molar ratios to the halogenated diphenol feed rate. Thus, carbonyl halide hydrolysis and the formation of undesired side products are minimized by employing a reaction procedure in which primary attention is given to maintaining the molar flow ratios of the caustic and carbonyl halide to the halogenated diphenol feed rate, with only secondary attention being directed to reaction pH. These ratios may vary depending on the desired quality of the product solution, production rate requirements, and the operating parameters of the reaction system.

In the present invention, a catalyst is used to effect the chloroformate synthesis reaction. Suitable catalysts include, but are not limited to, tertiary amines, including dimethyl n-alkyl amines. Examples include triethylamine; dimethylbutylamine (DMBA); methyltributyl ammonium chloride and mixtures thereof. In one embodiment, the catalyst is DMBA.

The ratio of the molar flow rates of the carbonyl halide, such as phosgene, to the halogenated diphenol introduced into the reaction system is preferably from about 1.1:1 to about 1:7:1, more preferably from about 1.2:1 to about 1.5:1. The ratio of the molar flow rates of the caustic (as equivalents of NaOH) to the halogenated diphenol in the reaction system is preferably from about 2:1 to about 4:1, more preferably from about 2.5:1 to about 3.5:1 even more preferably from about 3:1 to about 3.5:1.

The catalyst is added to the reaction system in a concentration effective to catalyze the chloroformate synthesis reaction. The concentration of catalyst necessary depends on the catalyst used. If the catalyst is triethylamine, for instance, from about 0.1 to about 2.0 mole % of catalyst should be used; if the catalyst is dimethylbutylamine, for instance, from about 0.1 to about 1.0 mol % of catalyst should be used; if the catalyst is methyltribuytl ammonium chloride, for instance, from about 0.5 to about 2.0 mole % of the catalyst should be used. In addition, mixtures of the catalysts may be used. The residence time required in the reactor will be lower for higher levels of catalyst. The appropriate amount of catalyst for a particular reactor configuration may be determined by experiment.

The components may be fed to the reaction system in separate streams, or alternatively, some components may be combined prior to introduction into the reaction system. For example, the carbonyl halide and the halogenated diphenol may each be introduced in one or more feed streams, at an input at the upstream end of the reaction system or at an input at any point in the reaction system. The overall molar ratios, however, must be maintained in the reaction system, i.e. between the input and output of the reaction system.

In one embodiment, the carbonyl halide is mixed with the inert organic solvent prior to introduction into the reaction system as a homogeneous solution. In another embodiment, the carbonyl halide is mixed with the inert organic solvent into which has been dissolved at least one halogenated diphenol, whereupon the mixture is fed as a homogeneous solution. The carbonyl halide may alternatively be introduced into the reaction system in the form of a gas. The aqueous caustic solution, which optionally contains some or all of the halogenated diphenol, is preferably fed to the reaction system in a separate stream from the input stream or streams containing the carbonyl halide.

If the reaction system comprises more than one stage, feed may be introduced into the reaction system between stages. Feed may include one or more of the following: aqueous caustic solution, inert organic solvent, carbonyl halide, and halogenated diphenol. In one embodiment, the invention is a tubular reactor which comprises from one to four stages.

The halogenated diphenol may be introduced into the reaction system as a solution, as a solid, as a melt, or a mixture thereof. The weight of the halogenated diphenol input to the reaction system, relative to the weight of the inert organic solvent input to the reaction system is from about 0.5:99.5 to about 30:70. The halogenated diphenol may be included in whole or in part in the inert organic solvent stream introduced into the reaction system. In one embodiment, the halogenated diphenol is dissolved in the inert organic solvent and the stream is fed into an input of the reaction system at the upstream end. If dissolved in the inert organic solvent, it is preferable that the halogenated diphenol comprises from about 1 to about 30 by weight of the solution. Optionally, carbonyl halide, such as phosgene, may be dissolved in this stream. Alternatively, the inert organic solvent and the diphenol compound may be introduced in separate streams at the input of the reaction system at the upstream end, or each stream may be divided into two or more streams and introduced at input points along the reaction system.

The residence time of the reaction mixture in the reaction system is a function of volumetric flow rate through the reaction system. If the reaction system is a tubular reactor, for instance, the length and diameter of the reactor may be varied to achieve a desired residence time and thereby achieve an optimum yield of the desired mono- and bis-chloroformates of halogenated diphenols product.

Design consideration that are common to plug flow reactors are described by Levenspiel in *Chemical Reaction Engineering*, John Wiley and Sons, 1962. Preferably, the length to diameter ratio of the tubular reactor is at least about 10, and more preferably at least about 20.

In the present invention it was surprisingly found that the residence time in the reactor is not critical. It was also surprisingly found that extra residence time in the reactor will not degrade the product. In general, the reaction occurs at a fast rate; the preferred residence time in the reactor may vary from about 0.5 seconds to about 240 seconds per stage, more preferably from about 1 to about 120 seconds per stage.

The following discussion sets forth the reactants, including caustic, and solvents which are suitable for use in the preparation of the mono- and bis-chloroformates of halogenated diphenols products suitable for use as endcapping agents. The particular components described are for illustrative purposes only, and the provided lists are not intended to be exhaustive.

Suitable halogenated diphenol compounds which may be used in the process to prepared oligomers from the halogenated chloroformates of the present invention are represented by the formula (I)

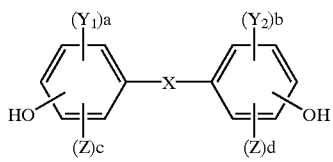

X is selected from the group consisting of substituted or unsubstituted divalent $C_1$–$C_{18}$ hydrocarbon radicals, —S—, —S—S—, —O—,

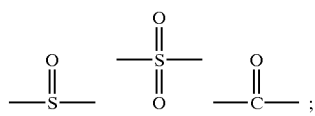

each Z is independently hydrogen, a linear or cyclic alkyl, alkoxy, aryl, alkayrl, aralkyl or aryloxy radicals. The preferred alkyl radicals are those containing from about 1 to about 12 carbon atoms. The preferred cyclic radicals are those containing from about 4 to about 8 ring carbon atoms. The preferred aryl radicals are those containing from about 6 to about 12 ring carbon atoms, i.e. phenyl, naphthyl, and biphenyl. The preferred alkaryl and aralkyl radicals are those containing from 7 to about 14 carbon atoms.

Each Y is the same or different halo radical, selected from the groups consisting of fluoro, chloro, bromo and iodo; and a is an integer from 0 to 4; b is an integer from 0 to 4; with the proviso that both a and b are not equal to 0; and c=4-a and d=4-b;

A particularly preferred halogenated diphenol is tetrabromo BPA (2,2-bis(4-hydroxy-3-bromophenyl)-propane) having the structure:

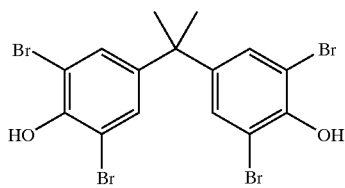

Suitable carbonyl halides for use in the present process to prepare halogenated chloroformates, include, but are not limited to carbonyl chlorides, such as phosgene, carbonyl bromide, carbonyl iodide, carbonyl fluoride and mixtures thereof. Other carbonyl halides including diphosgene and triphosgene are also suitable. Phosgene is the preferred carbonyl halide. The carbonyl halide may be introduced into the reaction system in the form of a gas or a liquid, or it may be dissolved in any feed stream except the caustic feed stream before the introduction of the feed stream into the reaction system. It is therefore possible to prepare other haloformates, such as bromoformates, etc. by the process of the invention. Chloroformates are the most preferred.

Suitable inert organic solvents for use in the process of the present invention to prepare halogenated chloroformates include any inert organic solvent that is substantially insoluble in water and inert to the process conditions. The inert organic solvent should also be a liquid under the reaction conditions and should not react with the carbonyl halide, the hydroxyaromatic compound or the caustic. It is desirable that the mono- and bis-chloroformates of halogenated diphenols product be soluble in the solvent. Suitable inert organic solvents include, but are not limited to aliphatic hydrocarbons such as pentane, hexane, cyclohexane, and heptane; aromatic hydrocarbons such as toluene, xylene; substituted aromatic hydrocarbons, such as chlorobenzene, dichlorobenzene, and nitrobenezene; chlorinated aliphatic hydrocarbons such as chloroform and methylene chloride, and mixtures of any of the aforementioned solvents. The aforementioned solvents may also be mixed with ethers, including but not limited to tetrahydrofuran. Chlorinated aliphatic hydrocarbons are preferred, in particular methylene chloride. The inert organic solvent is preferably introduced into the reaction system such that the chloroformate product has a concentration of from about 1 to about 40 weight percent.

The reaction to produce the mono- and bis-chloroformates of halogenated diphenols requires an alkali metal base and/or an alkaline-earth metal base, herein referred to as a caustic. The caustic compound is preferably introduced as an aqueous solution comprising the alkali metal base and/or alkaline-earth metal base.

Suitable alkali metal compounds which may be used as a caustic in the reaction system include, but are not limited to, sodium hydroxide, potassium hydroxide, lithium hydroxide, sodium hydrogen carbonate, potassium hydrogen carbonate, lithium hydrogen carbonate, sodium carbonate, potassium carbonate, lithium carbonate and mixtures thereof.

Suitable alkaline-earth metal compounds which may be used as a caustic in the reaction system include, but are not limited to, calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate and mixtures thereof.

The strength of the aqueous caustic solution may be varied, however it is preferable that the caustic compound comprise from about 10 wt % to about 50 wt % of the aqueous caustic solution, preferably between about 15 to about 40 wt %. The most preferred caustic is sodium hydroxide, and the aqueous caustic solution preferably comprises from about 15 wt % to about 40 wt % sodium hydroxide.

II. Process for Preparation of Capped Oligomers from Mono- or Bis-Chloroformates In a further aspect of the invention, the mono- or bis-chloroformates described in Section I of the specification may be used to prepare capped oligomers.

Suitable endcapping agents for preparing the capped oligomers include, but are not limited to phenol, p-tert-butylphenol; p-cumylphenol; p-cumylphenolcarbonate; undecanoic acid, lauric acid, stearic acid; phenyl chloroformate, t-butyl phenyl chloroformate, p-cumyl chloroformate, chroman chloroformate, hydrocardanol, nonyl phenol, octyl phenol; nonyl phenyl chloroformate or a mixture thereof. Furthermore, mixed carbonates and esters composed of endcappers from the list above along with phenol or alkylsalicylates are acceptable.

The organic phase prepared according to the method in section I may be combined in a reactor, for instance a continuous stirred tank reactor, and treated with phenol endcap, catalyst and caustic to prepare an oligomer. The endcap is preferably present at about 0.5 moles of endcap per mole of the residue of halogenated diphenol. In one embodiment, the number average molecular weight of the oligomer product based on polystyrene standards is from about 2500 to about 3500.

It was unexpectedly found that the use of 1% of a phase transfer catalyst, such as methyltributyl ammonium chloride, and about 0.1% of an unhindered amine, such as dimethylbutylamine, allows preparation of an oligomeric product without formation of tribromophenyl carbonate or urethane byproducts.

The oligomers are useful as additives in polymer processing. In particular, they are useful as flame retardants.

EXAMPLES

The following examples are set forth to provide those of ordinary skill in the are with a complete description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in °C.

Preparation of TBBPA Chloroformates

A tubular lab reactor with alternating mixing and residence time sections was constructed. The tubular reactor comprised a series of 5 sections. Each section included a mixing element (¼" O.D.×7" long) followed by 10 feet of open ¼"O.D. copper tubing. The tube was fed with three separate feed lines that are introduced into a cross. Phosgene, TBBPA in aqueous caustic soda, and catalyst in methylene chloride were simultaneously metered into the tubular reactor system. The reaction product was collected in a quench vessel containing 1 N HCl.

Table I shows the operating conditions and the measured phosgenation efficiency for a series of reactions. The phosgenation efficiency is defined as the number of moles of chloroformate end groups in the phosgenation product per mole phosgene delivered to the reactor.

Reactions 4-1, -3, -4, and -5 show that for a triethylamine catalyzed phosgenation, the reaction efficiency has a maximum with respect to the molar NaOH/TBB feed ratio at about 3.5 mole NaOH/mole TBB. Similarly, for reactions 5-1 and 5-2, which are catalyzed by phase transfer catalyst (MTBA, methyltributyl ammonium chloride), the efficiency is significantly higher for 2.0 mole NaOH per mole TBB than for 1.25 mole NaOH per mole TBB. Reactions 4 and 5 utilized a methylene chloride solution of TBBPA feed; reaction 6 utilized an aqueous caustic solution of TBBPA.

Comparing reaction 5-4 to all other reactions shows that the phosgenation efficiency is significantly increased by adding catalyst to the reaction, whether the catalyst is triethylamine, DMBA (dimethylbutylamine), or MTBA. Reaction 5-4 is comparable to the examples given is U.S. Pat. No. 5,212,281 (Dow).

Reactions 6-A, -B, -C, -D, and -J utilized triethylamine. A regression analysis on these reactions shows that the phosgenation efficiency increases with increasing catalyst level from 0.5% to 1.0% triethylamine and decreases with increasing NaOH/TBB (tetra bromo bisphenol) molar ratio from 2.5 to 3.5. The reaction efficiency is independent of the wt % NaOH over the range 2.5% to 5.0% NaOH.

Reactions 6-E through 6-H utilized DMBA as catalyst. A regression analysis of these results shows that reaction efficiency increases with increasing catalyst level from 0.1% to 0.5% and increases with increasing wt % NaOH from 2.5% to 5.0%. For this catalyst system, the reaction efficiency is independent of the molar ratio of NaOH to TBB over the range of 2.5 to 3.5.

In experiment 8C, it is noted that in addition to excellent phosgene efficiency, there was no remaining monomer (TBBPA) at the end of the phosgenation. No residual monomer in the product obviates monomer recycle, which is an advantage.

Tubular Reactor Operating Conditions and Results (Table I)

| | |
|---|---|
| COCl$_2$ Feed Rate: | 2.11 gm/minute (2 mole COCl2/mole TBBPA); 1.31 gm/min for 1.25 mole COCl2/mole TBBPA |
| TBBPA Feed Rate: | 9.3 gm/minute |
| CH$_2$Cl$_2$ Feed Rate: | 60.2 gm/minute |
| COCl$_2$/TBBPA: | 2 mole/mole except where noted |
| wt % Solids: | 15 gm polycarbonate equivalent[a]/100 gm resin solution |
| Reactor Volume: | 240 cc |
| Residence Time: | 2 minutes (nominal) |

TABLE I

| Reaction | mole % Catalyst | mole NaOH/ mole TBBPA | wt % NaOH | gm/min Aqueous Feed | % Remaining Monomer | Efficiency[b] |
|---|---|---|---|---|---|---|
| 4-1[c] | 0.5% TEA | 2.63 | 2.5 | 72 | 32 | 48 |
| 4-3[c] | 0.5% TEA | 2.89 | 2.5 | 79 | 22 | 59 |
| 4-4[c] | 0.5% TEA | 3.47 | 2.5 | 95 | 19 | 65 |
| 4-5[c] | 0.5% TEA | 3.65 | 2.5 | 100 | 29 | 60 |
| 5-1[c,d] | 1% MTBA | 1.25 | 2.3 | 37.4 | 47 | 47 |
| 5-2[c,d] | 1% MTBA | 2.0 | 2.3 | 59.8 | 70 | 70 |
| 5-3[c,d] | 1% TEA | 2.0 | 2.3 | 59.8 | 56 | 56 |
| 5-4[c,d] | None | 2.0 | 2.3 | 59.8 | 27 | 42 |
| 6-A | 0.5% TEA | 2.5 | 2.5 | 68.4 | 9 | 78 |
| 6-B | 0.5% TEA | 3.5 | 5.0 | 47.9 | 28 | 64 |
| 6-C | 1% TEA | 3.5 | 2.5 | 95.7 | 27 | 69 |
| 6-D | 1% TEA | 2.5 | 5.0 | 34.2 | 4 | 91 |
| 6-J | 1% TEA | 3.5 | 5.0 | 47.9 | 21 | 74 |
| 6-E | 0.1% DMBA | 3.5 | 2.5 | 95.7 | 25 | 49 |
| 6-F | 0.1% DMBA | 2.5 | 5.0 | 34.2 | 12 | 62 |
| 6-G | 0.5% DMBA | 2.5 | 2.5 | 68.4 | 24 | 59 |

TABLE I-continued

| Reaction | mole % Catalyst | mole NaOH/ mole TBBPA | wt % NaOH | gm/min Aqueous Feed | % Remaining Monomer | Efficiency[b] |
|---|---|---|---|---|---|---|
| 6-H | 0.5% DMBA | 3.5 | 5.0 | 47.9 | 19 | 69 |
| 8-C[e,f] | 1% DMBA | 3.5 | 5.0 | 47.9 | 0 | 92 |

[a]assumes repeat unit MW = 579 − 2 + 28 = 605

[b]efficiency $= 100\left(\frac{\text{mole CF ends}}{\text{mole COCl}_2 \text{ delivered}}\right)$

[c]TBBPA feed was dissolved in CH2Cl2; Aqueous Feed contained only 2.5 wt % NaOH
[d]1.25 mole $COCl_2$/mole TBBPA
[e]run under simulated plug flow conditions
[f]TBBPA feed was dissolved in CH2Cl2; Aqueous Feed contained only 5.0 wt % NaOH Preparation of Oligomers from TBBPA Chloroformates In Examples 9 and 10, the organic phases from reactions 4-3, 4-4 and 4-5 were combined and treated with phenol endcap, DMBA and aqueous NaOH solution to make capped oligomer. 100 mL of chloroformate product methylene chloride solution was mixed with 100 mL deionized water, phenol endcap (0.5 moles phenol per mole TBBPA repeat unit). At time zero, DMBA catalyst and 20 wt % NaOH were added. Table II shows the results of these oligomerizations The process of this invention is thus effective for making oligomerizable chloroformates of TBBPA.

TABLE II

| | Capping/Oligomerization Results | | | |
|---|---|---|---|---|
| Reaction | mole % DMBA | mL 20 wt % NaOH Required | Oligomerization Time (minutes) | Product Mw (PS Standards) |
| 9 | 2 | 9 | 18 | 2638 |
| 10 | 5 | 8 | 6 | 2866 |

This invention has been described in detail with particular reference to preferred embodiments thereof, but it will be understood that variations and modifications can be effected within the spirit and scope of the invention.

What is claimed is:

1. A continuous process for the preparation of mono- and bis-chloroformates from halogenated diphenols of structure (I)

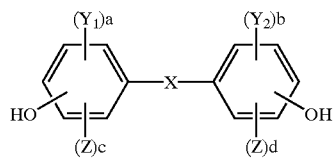

wherein X is selected from the group consisting of substituted or unsubstituted divalent $C_1$–$C_{18}$ hydrocarbon radicals, —S—, —S—S—, —O—,

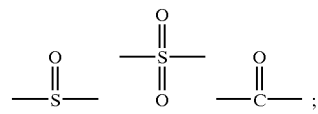

each Z is independently hydrogen, a linear or cyclic alkyl, alkoxy, aryl, alkaryl, aralkyl or aryloxy radical;

each Y is the same or different halo radical, selected from the groups consisting of fluoro, chloro, bromo and iodo; and a is an integer from 0 to 4; b is an integer from 0 to 4; with the proviso that both a and b are not equal to 0; and c=4-a and d=4-b; the process comprising the steps of:

a) introducing
1) an aqueous caustic solution;
2) a carbonyl halide;
3) at least one halogenated diphenol compound;
4) at least one inert organic solvent; and
5) a catalyst into a continuous reaction system; and b) effecting contact between 1), 2), 3) 4) and 5) for a time and at conditions sufficient to produce a chloroformate of the halogenated diphenol.

2. The process of claim 1, wherein the diphenol is TBBPA and wherein the catalyst is DMBA.

3. A chloroformate prepared by the method of claim 1.

4. The process of claim 1, wherein the product comprises form about 1.1 to about 1.5 chloroformate groups per halogenated diphenol introduced into the reaction system.

5. A method of preparing chloroformates of TBBPA comprising a) introducing
1) an aqueous caustic solution comprising caustic;
2) a carbonyl halide;
3) TBBPA;
4) at least one inert organic solvent; and
5) a catalyst selected from the group consisting of triethyleamine, DMBA, methyltributylammonium chloride and a mixture thereof into a tubular reactor, and b) effecting contact between 1), 2), 3), 4) and 5) for a time and at conditions effective to produce chloroformates of the halogenated diphenol wherein the ratio of the molar flow rate of the carbonyl halide to the TBBPA into the tubular reactor is form about 1.1:1 to about 1:7:1, and wherein the ratio of the molar flow rate of the caustic to the TBBPA is from about 2:1 to about 4:1.

6. The method of claim 5, wherein the carbonyl halide is phosgene, and wherein the catalyst is DMBA.

7. A chloroformate prepared by the method of claim 5.

8. The method of claim 5, wherein the product comprises from about 1.1 to about 1.5 chloroformate groups per TBBPA introduced into the reaction system.

9. The method of claim 8 wherein the catalyst is DMBA.

10. A method of preparing chloroformates of TBBPA comprising
   a) introducing
      1) an aqueous caustic solution comprising NaOH;
      2) phosgene;
      3) TBBPA;
      4) methylene chloride; and
      5) DMBA,
   into a tubular reactor, and
   b) effecting contact between 1), 2), 3), 4) and 5) for a time and at conditions effective to produce chloroformates of TBBPA wherein the ratio of the molar flow rate of the phosgene to the TBBPA into the tubular reactor is form about 1.1:1 to about 1:7:1, and wherein the ratio of the molar flow rate of the caustic to the TBBPA is from about 2:1 to about 4:1; and wherein the residence time in the reactor is less than 5 minutes and the efficiency is greater than 75%.

* * * * *

UNITED STATES PATENT AND TRADEMARK OFFICE
CERTIFICATE OF CORRECTION

PATENT NO. : 6,414,178 B1  Page 1 of 1
DATED : July 2, 2002
INVENTOR(S) : James M. Silva et al.

It is certified that error appears in the above-identified patent and that said Letters Patent is hereby corrected as shown below:

<u>Column 4,</u>
Line 44, replace "2,2-bis(4-hydroxy-3-bromophenyl)-propane" with
-- 2,2-bis(3,5-dibromo-4-hydroxyphenyl)propane --.

<u>Column 9,</u>
Line 39, replace "2,2-bis(4-hydroxy-3-bromophenyl)-propane" with
-- 2,2-bis(3,5-dibromo-4-hydroxyphenyl)propane --.

<u>Column 10,</u>
Line 54, delete the word "p-cumylphenolcarbonate".
Lines 56-57, replace "p-cumylchloroformate" with -- p-cumylphenylchloroformate --.

Signed and Sealed this

Twelfth Day of November, 2002

*Attest:*

*Attesting Officer*

JAMES E. ROGAN
*Director of the United States Patent and Trademark Office*